Nov. 7, 1961     H. E. ADAIR     3,007,437
SUNKEN OBJECT MARKER AND RETRIEVER
Filed Feb. 8, 1960

Harry E. Adair
INVENTOR.

BY *Clarence A. O'Brien*
*and Harvey B. Jacobson*
Attorneys

United States Patent Office 3,007,437
Patented Nov. 7, 1961

3,007,437
SUNKEN OBJECT MARKER AND RETRIEVER
Harry E. Adair, 153 St. James Drive, Lexington, Ky., assignor of one-third to Russell C. Adair and one-third to Richard H. Adair, Jr., both of Lexington, Ky.
Filed Feb. 8, 1960, Ser. No. 7,240
6 Claims. (Cl. 116—124)

The present invention relates to an improved buoy-type marker and retriever for sunken or submerged objects, for example, outboard motors, fishing tackle, boats and the like, and analogous things commonly referred to in this line of endeavor as lost objects.

The art to which the invention relates has been extensively explored and many and various marker buoys have been devised and proposed for use. A general object in the instant matter to make available an improved marker buoy, one which is expressly, but not necessarily, effectually adapted and designed for use on and in conjunction with an outboard motor, keeping in mind that outboard motors are indeed accidentally submerged and, being expensive equipment, should undoubtedly be provided with a marking and retrieving device such as the one herein revealed.

In carrying out the principles of the present invention, a novel float or buoy is provided. To this end, the buoy has a bottom portion which is conformable to and superimposed upon an adapter plate. The adapter plate, in turn, is conformably mounted and fixed atop an accessible portion of the motor housing of the outboard motor. Separable connection means between the adapter plate and bottom of the buoy makes sure that the buoy stays satisfactorily with the outboard motor in the event the same should be accidentally sunk. When, however, the buoy strikes the surface of the water the responsive connecting means allows the desired separation between the buoy and the adapter plate, the retrieving line being attached at the lower end to the plate and at its upper end to a storing spool carried by the buoy.

The invention also provides for the use of a buoy which takes the form of an appropriately contoured or shaped plastic or an equivalent shell. This shell is loaded with the desired buoyant material. In addition, the shell is provided with a special centrally disposed pocket the mouth of which is provided with a removable cover or lid. The lid supports the spool for the line and the spool and line are normally confined in the pocket.

By having the cover removable and the spool rotatable on the bottom thereof, the major portion of the line may be wound on the spool and sealed with a breakable adhesive compound. However, a portion of the line, say, two or three feet, is left free and coiled beneath the spool and within the confines of the pocket so that it is possible to detach the buoy from the adapter plate, because of the surplus line, and to work on the motor and to grease or lubricate the snap fasteners providing a separable connection between the buoy and adapter plate.

Other objects, features and advantages will become more readily apparent from the following description and the accompanying illustrative, but not restrictive, drawing.

In the drawing, wherein like numerals are employed to designate like parts throughout the views.

Figure 1:
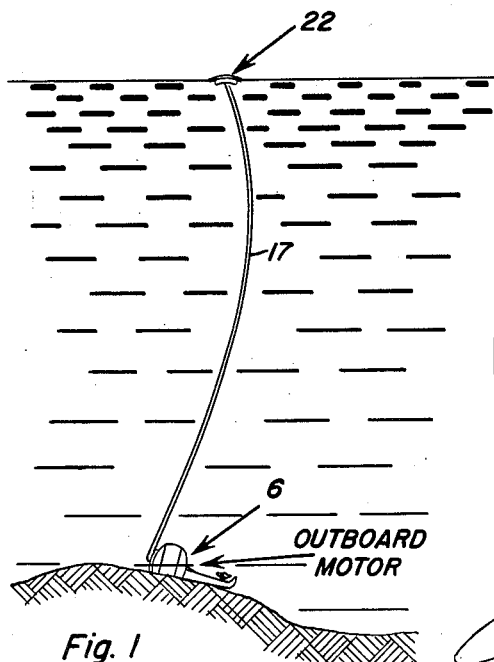
FIG. 1 is a view in elevation and on a small scale showing the outboard motor submerged, the connection between the motor and the buoy and with the buoy afloat to mark the spot for convenient retrieval work.

In the drawing, the outboard motor is denoted as an entity by the numeral 6. The aforementioned adapter plate is denoted at 8 and comprises a sheet of metal or the like which is conformably mounted on the top or crown 10 of the motor in the manner shown in FIG. 3. More particularly, this plate is conformable to the surface of the part 10 and is secured by screws or other fasteners 12. The plate is provided at the center with a U-shaped or an equivalent anchor or clevis 14 for the lower end portion 16 of the lowering and retrieving line 17. The numeral 18 designates the male components of snap fasteners which are engageable with complemental spring clips 20 carried by the marker buoy 22. This marker buoy comprises a plastic or an equivalent shell 24 having a convex top 26 and a concave bottom 28 which is superimposed and fittingly mounted atop the adapter plate. This bottom is provided with socket members 30 in which the clips 20 are mounted. The marginal portion of the top of the shell has an outstanding flange or rim 32 which may be used as handling means for applying and removing the buoy. The hollow portion of the buoy is charged or loaded with an appropriate buoyant filler 34. It will also be noticed that the central portion of the shell embodies a truncated conical member 36 defining a pocket 37. The truncated end 36A is open to accommodate the anchor or clevis 14 and the line 17 which extends therethrough. The major portion of the line 17 is wound or reeled in the grooved periphery of the spool 38, the spool being mounted on a headed stem or spindle 40 carried by the underneath side of the detachable cover or lid 42 for the pocket 37. The cover is held in place by screw-threads 44 and has a suitable grip 46 to facilitate application and removal of said cover. The major portion of the line is held in a spooled condition on the spool by an adhesive compound (not detailed). This compound keeps the wrappings from unwinding. However, the portion 48 is free as brought out in FIG. 3. This line portion 48 is utilized so that it is possible to completely detach the buoy 22 from the adapter plate while greasing or lubricating the snap fastener components or while, if necessary, working on the motor and for other reasons.

The protective seal or coating upon the windings of the line will prevent the line from accidentally reeling off until the retriever or marker actually comes into use.

Figure 2:
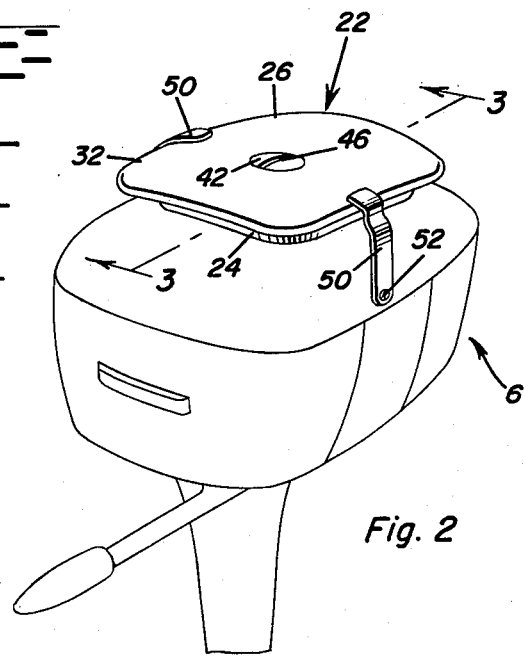
FIG. 2 is a view in perspective of the buoy mounted operatively atop the outboard motor housing and held with temporarily usable straps which may be employed for transportation and other storage and shipping needs.
Figure 3:
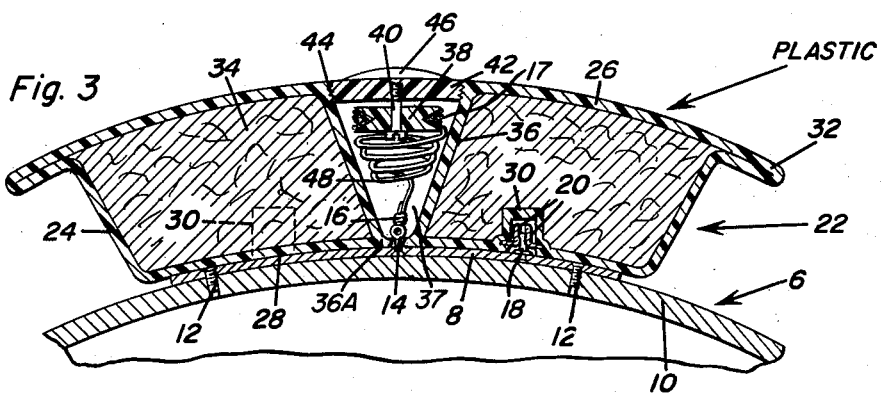
FIG. 3 is an enlarged view with parts in elevation taken on the plane of the line 3—3 of FIG. 2.
Figure 4:
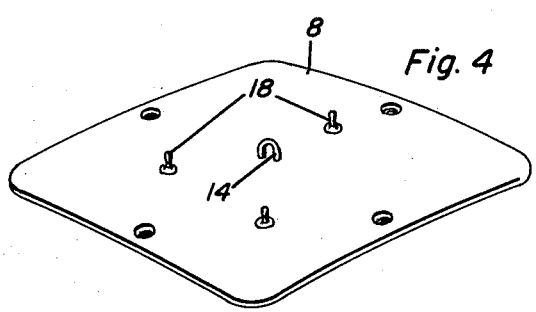
FIG. 4 is a perspective view of the aforementioned adapter plate.

It will be evident that the adapter plate 8 is securely fixed atop the "object" 6, that the conforming bottom of the shell portion of the buoy 22 is superimposed on the plate and is snapped releasably in position. Assuming then that the device is as depicted in FIG. 3, it is ready to function. That is to say, and further assuming that the temporary hold-down straps 50 (FIG. 2) are unfastened at 52 it will be evident that the operation is as depicted in FIG. 1. Here one observes that the outboard motor has gone overboard and has submerged to the bottom as illustrated. As the flange 32 strikes the surface of the water it assists in separating the coupling or connecting means (snap fasteners) between the buoy 22 and the object 6. The strain or pull on the line breaks the adhesive seal and allows the line to unwind. It is further assumed that the strength of the line is such that after the sunken object has been located it may be retrieved with the aid of the line. Otherwise it might have to be brought up by a diver or by way of other known retrieving methods.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A marker buoy and retriever for a submerged object comprising an adapter plate constructed and designed to be fixed to a predetermined surface of a sinkable object, a marker buoy having a surface conformable to and removably superimposed on said adapter plate, load responsive means providing a separable connection between the adapter plate and said surface, a spool accessibly and removably mounted for rotation in a pocket provided therefor in said buoy, and a connecting and retrieving line having a lower end capable of being secured to said object and an upper end and major portion wound and stored for ready use on said spool, the outermost windings of the stored line being normally retained against premature spooling-off the spool by an adhesive coating, the latter yielding its normal retentive action when the tension on the line between the spool and object renders the coating ineffective, whereby the stored portion of the line spools off said spool, pays out and allows the buoy to ascend.

2. A marker buoy and retriever for a submerged object comprising an adapter plate designed and adapted to be fixed atop a conformable surface of a sinkable object, a marker buoy having a surface conformable to and removably superimposed on said adapter plate, load responsive means affording a separable connection between the surfaces of the plate and said buoy, a spool mounted for rotation within the confines of a limited space provided therefor in said buoy, a connecting and retrieving line having a lower end secured to said object and its upper end and a major portion wound and stored for ready use on said spool, the outermost windings of the stored line being normally retained against premature spooling-off by adhesive media normally coating the same, said coating yielding its retentive action when the tension on the line between the spool and object becomes active and operative, and a portion of the line adjacent the spool being unwound and free in said limited space, said portion being some several feet more-or-less to assist in yanking the coated and stored retrieving line free from the spool, said line having a lower end secured to said object and its upper end and major portion wound and stored for ready use on said spool.

3. The structure defined in claim 2, and wherein said buoy comprises a plastic shell filled with buoyant material, the upper central portion of said shell having a pocket and a removable cover for said pocket, said spool being mounted for free-reeling on the underneath side of the cover and being housed in the pocket.

4. In a marker and retriever for a submerged object, a buoy having a bottom surface provided with snap fastener clips, an adapter plate adapted to be fixed on said object and provided with snap fastener studs releasably connected to their respective clips, said buoy having a pocket provided with a removable cover, and a line containing spool operatively suspended from the cover and confined in said pocket.

5. In combination an adapter plate designed and adapted to be affixed atop an outboard motor and provided with male-type snap fasteners, a locator and marker buoy comprising a buoyant shell having a bottom conformable to and superimposed upon the adapter plate and provided with female snap fasteners releasably receiving the male snap fasteners and separably joining the buoy to the adapter plate, said buoy having an outstanding marginal flange overhanging the body portion of the shell and spaced above the adapter plate, said flange being provided with hold-down straps and said straps being separably connectible to an outboard motor.

6. The structure defined in claim 5, and wherein said buoy is provided centrally with a truncated conical member defining a pocket, a removable cover for the mouth of the pocket, said cover having a spindle depending into said pocket, a spool mounted for free rotation on said spindle and confined in said pocket, said adapter plate having an anchor affixed thereto and projecting into said pocket, a retrieving line the lower end of which is connected to said anchor, said line adapted to extend through the truncated bottom portion of said pocket, a limited portion of the line in the pocket being uncoiled and free, the major portion of said line being wound on the spool and held thereon for releasable use by a frangible sealing compound.

References Cited in the file of this patent

UNITED STATES PATENTS

| | | |
|---|---|---|
| 2,738,524 | Peary | Mar. 20, 1956 |
| 2,820,971 | Welsh | Jan. 28, 1958 |